United States Patent
Ball et al.

(10) Patent No.: US 7,527,319 B2
(45) Date of Patent: May 5, 2009

(54) INSTRUMENT PANEL GROMMETS

(75) Inventors: Landon N. Ball, North Augusta, SC (US); Richard Krall, Augusta, GA (US); Bradley J. Hanson, North Augusta, SC (US); Donald S. Hanson, Evans, GA (US); Albert G. Packard, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/620,769

(22) Filed: Jan. 8, 2007

(65) Prior Publication Data

US 2008/0163452 A1 Jul. 10, 2008

(51) Int. Cl.
*B60J 7/00* (2006.01)
(52) U.S. Cl. ..................................... 296/102
(58) Field of Classification Search ................ 296/102, 296/103, 181.4, 181.7, 43
See application file for complete search history.

(56) References Cited

U.S. PATENT DOCUMENTS

| 1,026,358 | A | * | 5/1912 | McCallister | 296/103 |
|---|---|---|---|---|---|
| 1,242,673 | A | * | 10/1917 | Fisher | 296/103 |
| 1,473,875 | A | * | 11/1923 | Robertson | 296/103 |
| 5,031,713 | A | * | 7/1991 | Criscuolo | 180/89.1 |
| D498,704 | S | * | 11/2004 | Bonner et al. | D12/16 |
| 7,210,723 | B2 | * | 5/2007 | Sugawara et al. | 296/24.34 |
| 7,222,905 | B2 | * | 5/2007 | Jaeck | 296/1.07 |
| 7,270,363 | B1 | * | 9/2007 | Hanson et al. | 296/70 |
| D552,508 | S | * | 10/2007 | Hanson et al. | D12/16 |
| 2006/0081668 | A1 | * | 4/2006 | Haines et al. | 224/274 |
| 2007/0007315 | A1 | * | 1/2007 | Hanson et al. | 224/274 |
| 2007/0216184 | A1 | * | 9/2007 | Hanson et al. | 296/37.12 |
| 2007/0257508 | A1 | * | 11/2007 | Ball et al. | 296/102 |

* cited by examiner

*Primary Examiner*—Joseph D Pape
(74) *Attorney, Agent, or Firm*—Harness, Dickey & Pierce, P.L.C.

(57) ABSTRACT

The present teachings can provide for a golf car including: a front body; a rear body; a roof suspended above at least a portion of each of the front body and the rear body; an instrument panel mounted to the front body, the instrument panel having an outer surface facing the roof; a aperture in the outer surface of the instrument panel; and a roof strut extending from the roof and passing through the aperture.

20 Claims, 4 Drawing Sheets

INSTRUMENT PANEL GROMMETS

FIELD

The present disclosure relates to a method and apparatus for a golf car.

BACKGROUND

The statements in this section merely provide background information related to the present disclosure and may not constitute prior art.

Golf cars can be provided with a roof that can cover a portion of the golf car to shelter passengers from rain, sun, etc. The roof can include roof struts mounted to a front body of the car and to a rear body of the car to support the roof. The roof struts mounted to the front body of the car are often mounted to opposite exterior side surfaces of the front body. The roof struts protrude from the sides of the car and add to the width of the car. While such roof struts, and such a mounting configuration for the roof struts, are suitable for their intended uses, they are subject to improvement.

SUMMARY

The present teachings can provide for a golf car including: a front body; a rear body; a roof suspended above at least a portion of each of the front body and the rear body; an instrument panel mounted to the front body, the instrument panel having an outer surface facing the roof; a aperture in the outer surface of the instrument panel; and a roof strut extending from the roof and passing through the aperture.

The present teachings can further provide for a golf car including: an instrument panel; an opening in the instrument panel; a roof; a roof support strut extending from the roof and through the opening; and a trim collar positioned in the opening and surrounding the support strut.

The present teachings can also provide for a golf car including: an instrument panel; an aperture positioned within an outer surface of the instrument panel to receive a roof support strut; and a rubber trim piece seated within the aperture.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
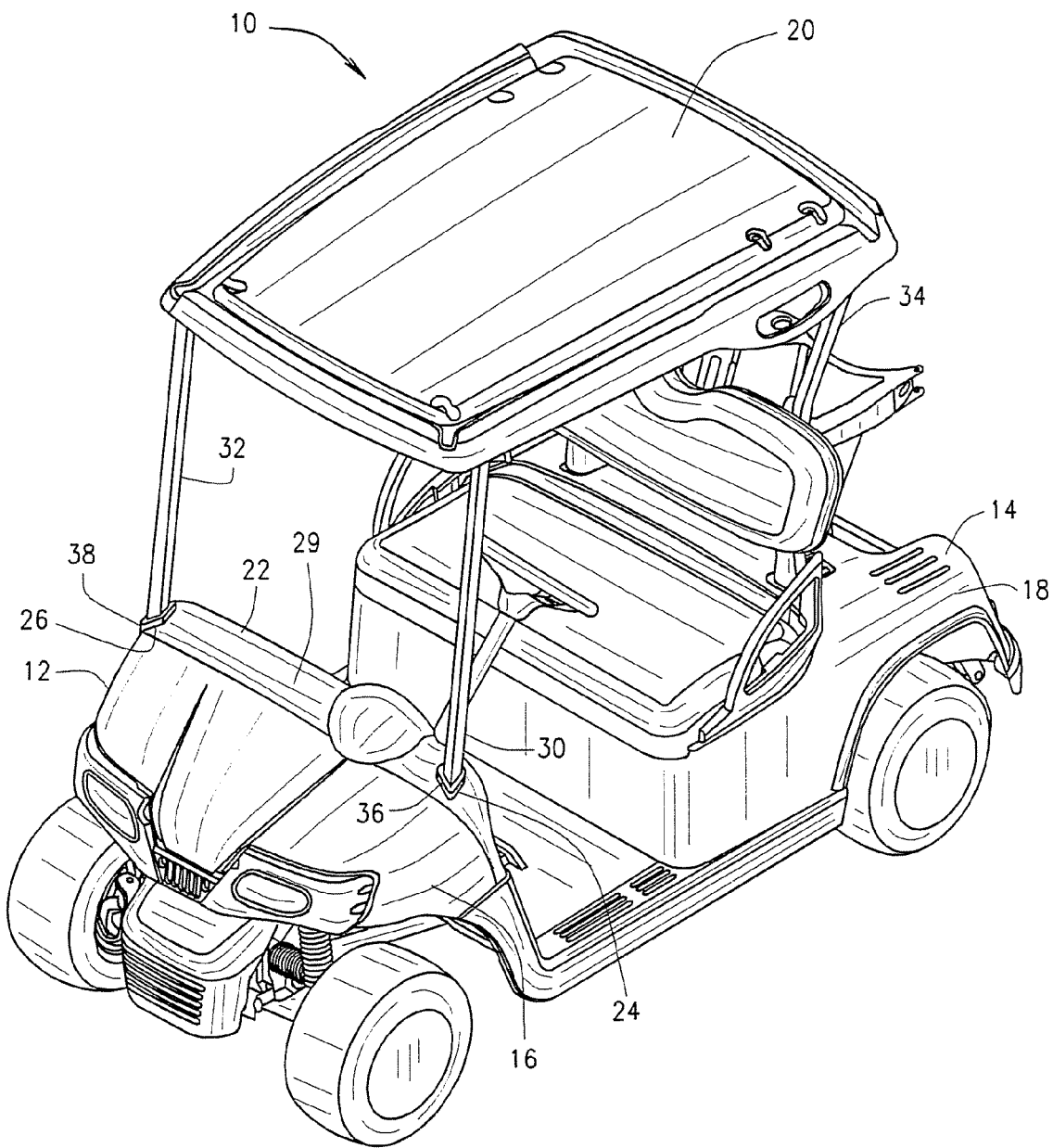
FIG. 1 is a perspective view of a golf car according to the present teachings.

The following description is merely exemplary in nature and is in no way intended to limit the present disclosure, application, or uses. Throughout this specification, like reference numerals will be used to refer to like elements.

A golf car according to the present teachings is illustrated in FIG. 1 at reference numeral 10. The golf car 10 can include a front end 12 and a rear end 14. The front end 12 can include a front body 16 and the rear end 14 can include a rear body 18. The car 10 can further include a roof 20.

Figure 2:
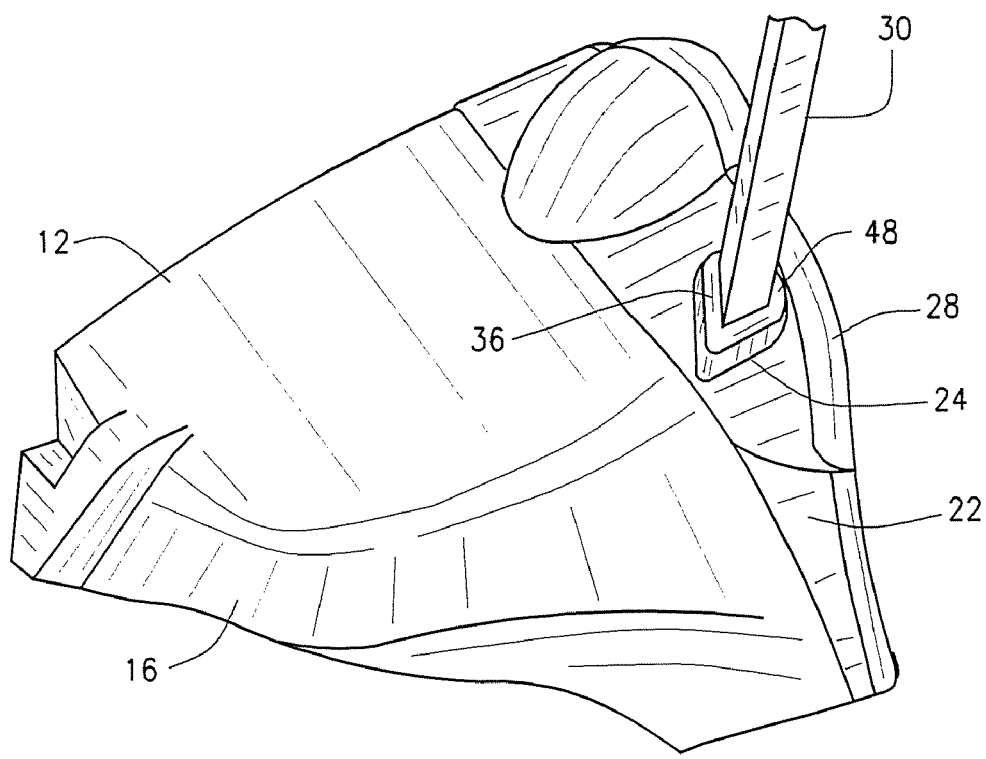
FIG. 2 is a close-up perspective view of a front body of the golf car illustrating an instrument panel having an aperture and a first trim piece in the aperture.

With continued reference to FIG. 1 and additional reference to FIG. 2, the front body 16 can include an instrument panel 22. The instrument panel 22 can include a first aperture 24, a second aperture 26, and an instrument panel (IP) trim portion 28 (FIG. 2), which can include an outer surface 29 that can face the roof 20. The first aperture 24 can be located within the outer surface 29 of the instrument panel 22 at a driver's side of the car 10. The second aperture 26 can be located within the outer surface 29 of the instrument panel 22 at a passenger's side of the car 10.

The first aperture 24 and the second aperture 26 can be at least substantially identical. The portions of the outer surface 29 of the instrument panel 22 that the first and the second apertures 24 and 26 can be formed in can be curved. The first and the second apertures 24 and 26 can have a generally square or generally parallelogram shape.

As illustrated in FIG. 2, the IP trim portion 28 can extend along a portion of the instrument panel 22 that faces the rear end 14 of the car 10. The IP trim 28 can also extend to the outer surface 29 of the instrument panel 22. The IP trim 28 can be made of any suitable material, such as a suitable polymer.

The roof 20 can include a number of supports or struts to support the roof 20. Specifically, the roof 20 can include a first front strut 30, a second front strut 32, and two rear struts 34 (a single rear strut 34 is illustrated). The first front strut 30 extends between the roof 20 and the driver's side of the instrument panel 22. The first strut 30 extends through the first aperture 24 and can be mounted within the front body 16. The second strut 32 extends between the roof 20 and the passenger's side of the instrument panel 22. The second strut 32 extends through the second aperture 26 and can be mounted within the front body 16. The rear struts 34 are mounted to the rear body 18 in any suitable manner known in the art.

A first trim piece or grommet 36 can be seated within the first aperture 24 and a second trim piece or grommet 38 can be seated within the second aperture 26. The first grommet 36 can be substantially similar to the second grommet 38. Therefore, the below description of the first grommet 36 can equally apply to the second grommet 38.

Figure 3:
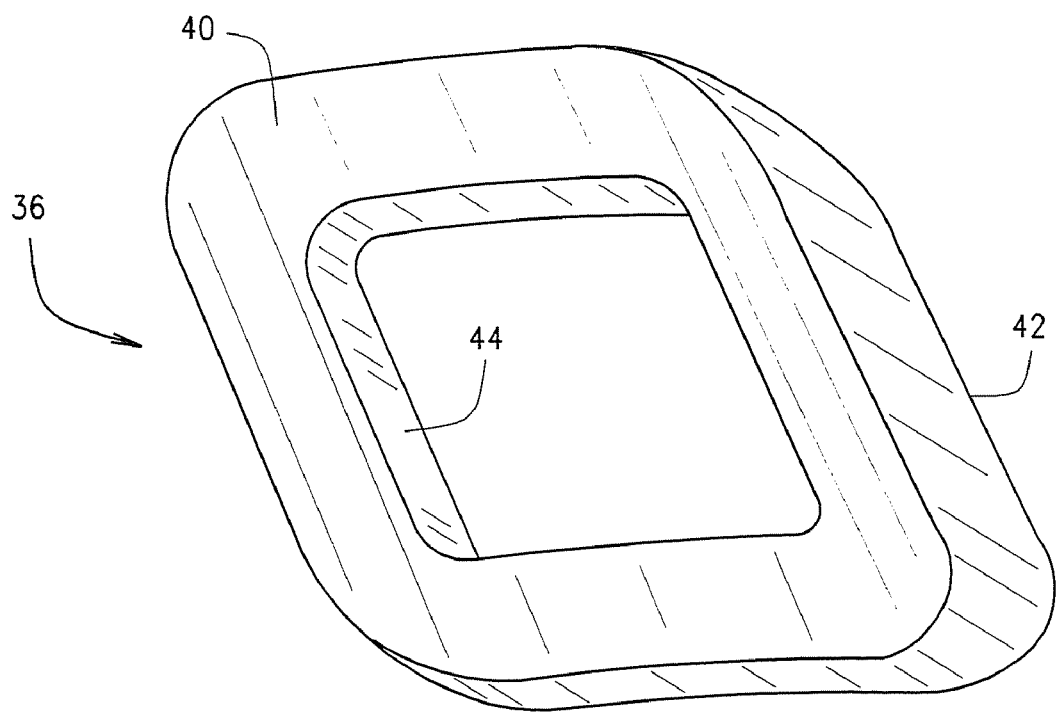
FIG. 3 is a top perspective view of the first trim piece.
Figure 4:
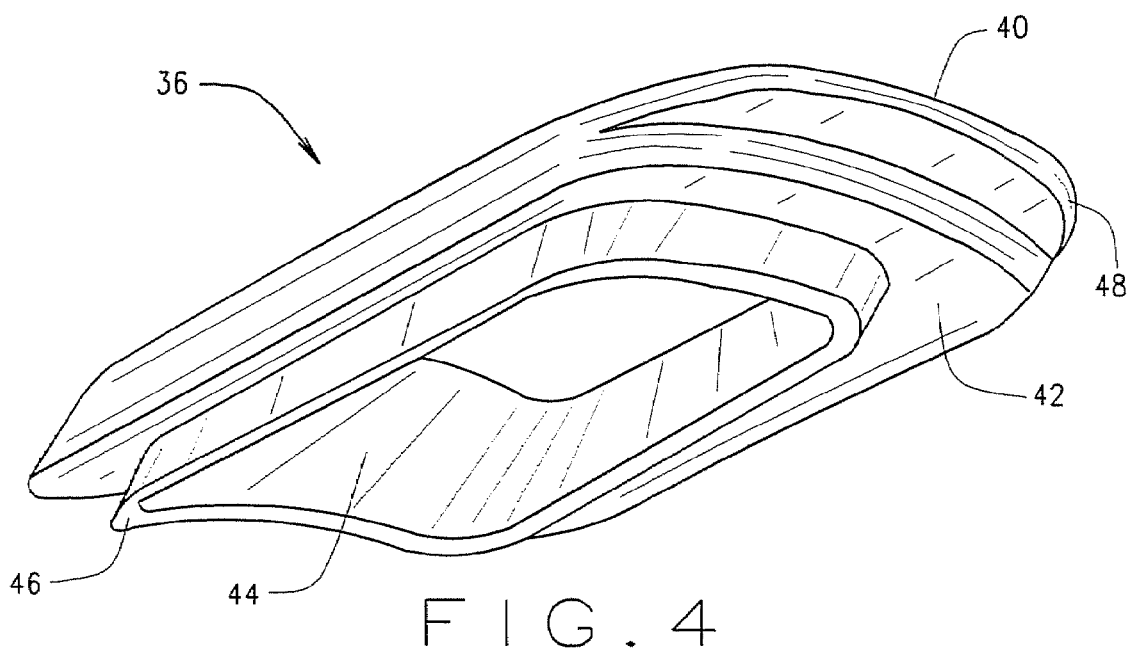
FIG. 4 is bottom perspective view of the first trim piece.

With additional reference to FIGS. 3 and 4, the first grommet 36 can include an upper surface 40, a lower surface 42, an opening 44, a lower flange 46, and a lip 48. The upper surface 40 can be opposite the lower surface 42. The opening 44 can extend from the upper surface 40 to the lower surface 42. The lower flange 46 can extend from the lower surface 42. The lower flange 46 can extend around the opening 44 and the opening 44 can extend through the lower flange 46. The lip 48 can be planar with the upper surface 40 and can be spaced apart from the lower surface 42 such that the distance from the upper surface 40 to the lower surface 42 can be greater than the thickness of the lip 48.

The first grommet 36 can be made of any suitable material. For example, the first grommet 36 can be made from a rubber material, such as ethylene propylene diene monomer (EPDM) rubber, styrene butadiene rubber (SBR), natural rubber, and rubberized polymers. The first grommet 36 can also be made of silicone. The first grommet 36 can be of any suitable size or shape that permits it to be inserted within the first aperture 24. For example, the first grommet 36 can generally be a collar having a generally square or parallelogram shape.

With renewed reference to FIG. 2, the first grommet 36 can be seated within the first aperture 24 such that the upper surface 40 is exposed at the outer surface 29 of the instrument panel 22 and the lower surface 42 is recessed within the first aperture 24. The lower flange 46 can also extend within the first aperture 24. The lip 48 can be seated on the outer surface 29 of the instrument panel 22. The first grommet 36 can be orientated so that the lip 48 is positioned between the first aperture 24 and the IP trim portion 28. The lip 48 can serve as a handle to facilitate insertion and removal of the first grommet 36 from within the first aperture 24.

The first front strut 30 extends through the opening 44 of the first grommet 36 when the first grommet 36 is seated within the first aperture 24. The first grommet 36 can completely surround the first front strut 30. The first grommet 36 can be secured to the first front strut 30 through a friction fit between the opening 44 and the first front strut 30. The friction fit between the opening 44 and the strut 30 can also maintain the first grommet 36 in the first aperture. The first grommet 36 can also engage the first aperture 24 via a friction fit to further secure the first grommet 36 in the first aperture 24.

The second grommet 38 can be mounted to the second strut 32 and within the second aperture 26 in the same way that the first grommet 36 is mounted to the first strut 30 and within the first aperture 24.

Figure 5:
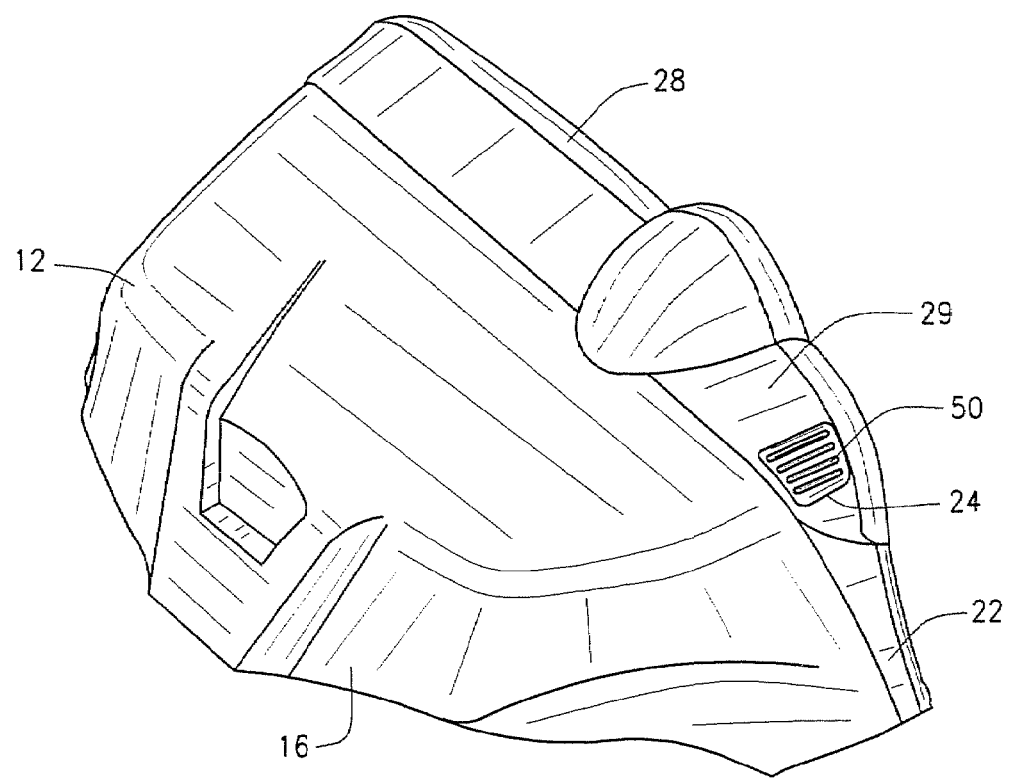
FIG. 5 is a close-up view of the front body of the golf car illustrating a second trim piece completely covering the aperture.

With additional reference to FIG. 5, in some applications the roof 20 of the golf car 10 can be removed along with the front and rear support struts 30, 32, and 34 and the first and second grommets 36 and 38. In such applications, the first aperture 24 can be covered with a second trim piece or cover 50. The second aperture 26 can also be covered with a cover (not shown) that can be similar to the cover 50.

Figure 6:
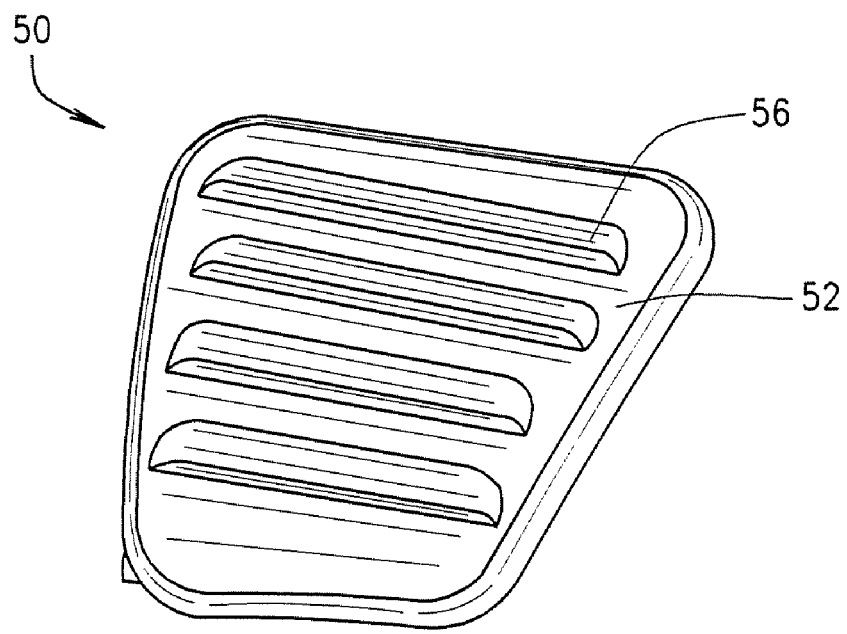
FIG. 6 is a top perspective view of the second trim piece of FIG. 5.
Figure 7:
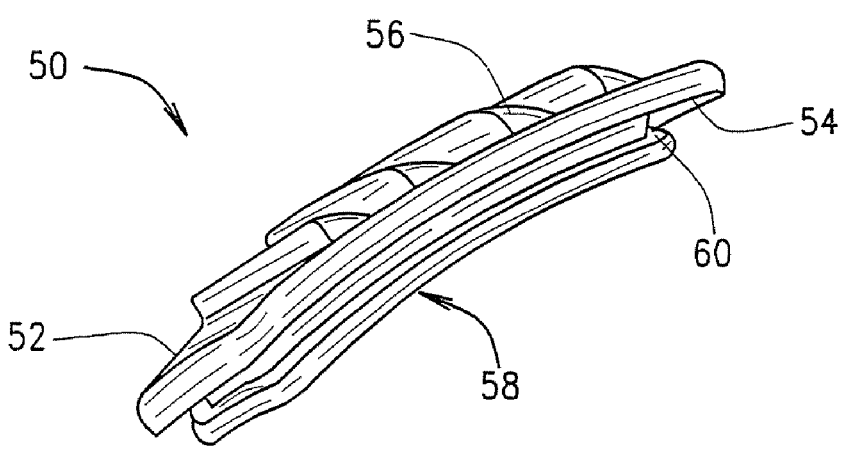
FIG. 7 is a side perspective view of the second trim piece of FIG. 5.

With additional reference to FIGS. 6 and 7, the cover 50 can include a top surface 52 and a bottom surface 54. The top surface 52 can be opposite to the bottom surface 54. The top surface 52 can include one or more ridges 56 that can extend across the top surface 52. The bottom surface 54 can include a cover flange 58 that can extend from the bottom surface 54. The cover flange 58 can include a rim 60 that can be spaced apart from the bottom surface 54. The rim 60 can be an annular rim that can extend around a circumference of the cover flange 58.

The cover 50 can be any suitable shape and size operable to cover the first aperture 24. The cover 50 can be made of any suitable material, such as EPDM rubber.

The cover 50 can be secured within the first aperture 24 to provide the first aperture 24 with a cover or lid. The cover 50 can be positioned within the aperture 24 such that the cover flange 58 is seated within the first aperture 24 and the bottom surface 54 rests on the outer surface 29 of the instrument panel 22. The cover 50 can be further positioned so that a perimeter edge of the first aperture 24 can be between the bottom surface 54 and the rim 60 of the cover flange 58 to secure the cover 50 within the first aperture 24. In applications where the cover 50 is made of rubber, the cover flange 58 can be easily compressed to allow the cover 50 to be inserted in and removed from the first aperture 24.

Mounting the front struts 30 and 32 within the first and second apertures 24 and 26 increases the usable width of the golf car 10 as compared to conventional golf cars in which the front struts 30 and 32 are mounted to the exterior sides of the car. For example, golf cars are often made to an optimum overall width to facilitate storage and transportation, which for conventional golf cars includes width added by roof struts that protrude from the sides of the car 10. The width added by the struts is not desirable because it cannot be used by the operator or passenger of the car. By moving the struts 30 and 32 inboard so that they extend through the apertures 24 and 26 respectively, the present teachings permit the usable width of the car 10 to be increased by the width of the struts without increasing the overall width of the car 10 as compared to conventional cars.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A golf car comprising:
a front body;
a rear body;
a roof suspended above at least a portion of each of said front body and said rear body;
an instrument panel mounted to said front body, said instrument panel having an outer surface facing said roof;
a aperture in said outer surface of said instrument panel; and
a roof strut extending from said roof and passing through said aperture.

2. The golf car of claim 1, further comprising a grommet located in said aperture between said roof strut and said instrument panel.

3. The golf car of claim 2, wherein said grommet comprises an opening, said first roof strut extending through said opening.

4. The golf car of claim 2, wherein said grommet comprises a lip seated on said outer surface of said instrument panel between said aperture and a trim portion of said instrument panel.

5. The golf car of claim 2, wherein said grommet comprises a lower surface and a lower flange extending from said lower surface, said lower flange positioned within said aperture.

6. The golf car of claim 2, wherein said grommet comprises a rubber material.

7. The golf car of claim 2, wherein said grommet comprises at least one of ethylene propylene diene monomer rubber, styrene butadiene rubber, natural rubber, silicone, or rubberized polymers.

8. A golf car comprising:
an instrument panel;
an opening in said instrument panel;
a roof;
a roof support strut extending from said roof and through said opening; and
a trim collar positioned in said opening and surrounding said support strut.

9. The golf car of claim 8, wherein said trim collar comprises an opening and said roof support strut passes through said opening.

10. The golf car of claim 9, wherein said trim collar comprises an upper surface and a lower surface comprising a lower flange that extends within said opening.

11. The golf car of claim 8, wherein said trim collar comprises a grommet.

12. The golf car of claim 8, wherein said trim collar comprises rubber.

13. The golf car of claim 8, wherein said trim collar comprises at least one of ethylene propylene diene monomer rubber, styrene butadiene rubber, natural rubber, silicone, and rubberized polymers.

14. A golf car comprising:
   an instrument panel;
   an aperture positioned within an outer surface of said instrument panel to receive a roof support strut; and
   a rubber trim piece seated within said aperture.

15. The golf car of claim 14, wherein said trim piece comprises at least one of ethylene propylene diene monomer rubber, styrene butadiene rubber, natural rubber, silicone, and rubberized polymers.

16. The golf car of claim 14, wherein said trim piece completely covers said aperture.

17. The golf car of claim 16, wherein said trim piece comprises a top surface, a bottom surface, and a flange extending from said bottom surface, said flange comprising a rim that is spaced apart from said bottom surface.

18. The golf car of claim 14, wherein said golf car further comprises a roof suspended above at least a portion of said front body and said rear body by a support strut;
   wherein said trim piece comprises an opening, said roof strut extending through said opening.

19. The golf car of claim 18, wherein said trim piece is positioned between said aperture and said roof strut.

20. The golf car of claim 18, wherein said instrument panel comprises an instrument panel trim portion;
   wherein said trim piece comprises a lip positioned between said aperture and said instrument panel trim portion.

* * * * *